US007151996B2

(12) United States Patent
Stein (10) Patent No.: US 7,151,996 B2
(45) Date of Patent: Dec. 19, 2006

(54) SYSTEM AND METHOD FOR GENERATING A MODEL OF THE PATH OF A ROADWAY FROM AN IMAGE RECORDED BY A CAMERA (75) Inventor: Gideon P. Stein, Jerusalem (IL)

(73) Assignee: Mobileye Technologies Limited, Nicosia (CY)

( * ) Notice: Subject to any disclaimer, the term of this patent is extended or adjusted under 35 U.S.C. 154(b) by 0 days.

(21) Appl. No.: 09/834,736

(22) Filed: Apr. 14, 2001

(65) Prior Publication Data
US 2003/0040864 A1 Feb. 27, 2003

(51) Int. Cl.
G01C 21/26 (2006.01)
(52) U.S. Cl. .................. 701/200; 701/223; 701/211; 701/209; 382/181
(58) Field of Classification Search ............. 701/1, 701/200, 201, 205, 223–225, 300, 301, 36, 701/23, 25, 26, 28, 209, 211; 73/178 R; 340/901; 348/207.99, 844; 382/168, 170, 382/171, 173, 181, 312, 316
See application file for complete search history.

(56) References Cited

U.S. PATENT DOCUMENTS

| 4,819,169 | A | * | 4/1989 | Saitoh et al. ................ 701/28 |
| 4,910,786 | A | * | 3/1990 | Eichel ......................... 382/199 |
| 5,189,710 | A | * | 2/1993 | Holt ............................ 382/273 |
| 5,233,670 | A | * | 8/1993 | Dufour et al. ............... 382/197 |
| 5,245,422 | A | * | 9/1993 | Borcherts et al. ........... 348/119 |
| 5,446,549 | A | * | 8/1995 | Mazumder et al. | |
| 5,473,364 | A | | 12/1995 | Burt ............................. 348/47 |
| 5,515,448 | A | | 5/1996 | Nishitani | |
| 5,521,633 | A | | 5/1996 | Nakajima et al. | |
| 5,529,138 | A | | 6/1996 | Shaw et al. | |
| 5,642,093 | A | | 6/1997 | Kinoshita et al. | |
| 5,646,612 | A | | 7/1997 | Byon | |
| 5,717,781 | A | * | 2/1998 | Ebel et al. .................... 382/141 |
| 5,809,161 | A | | 9/1998 | Auty et al. | |
| 5,850,254 | A | | 12/1998 | Takano et al. | |
| 5,862,245 | A | * | 1/1999 | Renouard et al. ........... 382/113 |
| 5,913,375 | A | | 6/1999 | Nishikawa | |
| 5,974,521 | A | * | 10/1999 | Akerib ........................ 712/11 |
| 5,987,152 | A | | 11/1999 | Weisser | |
| 5,987,174 | A | * | 11/1999 | Nakamura et al. .......... 382/199 |
| 6,097,839 | A | * | 8/2000 | Liu ............................. 382/181 |
| 6,128,046 | A | * | 10/2000 | Totsuka et al. ............. 348/590 |

(Continued)

FOREIGN PATENT DOCUMENTS

CA    2047811 A  *  2/1992

(Continued)

OTHER PUBLICATIONS

Tian, Aliling et al., Three-dimensional profile measurement of objects with spatially isolated surfaces by modified temporal phase unwrapping, Journal of Xi'An Jiaotong university, vol. 36 No. 11, Nov. 2004, pp. 1196-1198.*

(Continued)

Primary Examiner—Cuong H. Nguyen
(74) Attorney, Agent, or Firm—Fenster & Co (57) ABSTRACT A road skeleton estimation system generates an estimate as to a skeleton of at least a portion of a roadway ahead of a vehicle. The road skeleton estimation system includes an image receiver and a processor. The image receiver is configured to receive image information relating to at least one image recorded ahead of the vehicle. The processor is configured to process the image information received by the image receiver to generate an estimate of the skeleton of at least a portion of the roadway ahead of the vehicle.

26 Claims, 9 Drawing Sheets

U.S. PATENT DOCUMENTS

| | | | |
|---|---|---|---|
| 6,130,706 A * | 10/2000 | Hart et al. | 348/148 |
| 6,161,071 A * | 12/2000 | Shuman et al. | 701/48 |
| 6,246,961 B1 | 6/2001 | Sasaki et al. | |
| 6,313,840 B1 * | 11/2001 | Bilodeau et al. | 345/423 |
| 6,353,785 B1 * | 3/2002 | Shuman et al. | 701/48 |
| 6,424,430 B1 * | 7/2002 | Bilodeau et al. | 358/1.2 |
| 6,460,127 B1 * | 10/2002 | Akerib | 712/10 |
| 6,501,848 B1 * | 12/2002 | Carroll et al. | 382/128 |
| 6,505,107 B1 * | 1/2003 | Kuragaki et al. | 701/36 |
| 6,526,352 B1 * | 2/2003 | Breed et al. | 701/213 |
| 6,560,529 B1 * | 5/2003 | Janssen | 701/200 |
| 6,675,081 B1 * | 1/2004 | Shuman et al. | 701/48 |
| 2003/0065432 A1 * | 4/2003 | Shuman et al. | 701/48 |
| 2004/0122587 A1 * | 6/2004 | Kanemitsu | 701/200 |
| 2005/0060069 A1 * | 3/2005 | Breed et al. | 701/29 |
| 2005/0137786 A1 * | 6/2005 | Breed et al. | 701/200 |

FOREIGN PATENT DOCUMENTS

| | | | |
|---|---|---|---|
| EP | 473476 A * | 3/1992 | |
| JP | 06-107096 | 4/1994 | |
| JP | 2001-0347699 | 2/2001 | |
| JP | 2002-367059 * | 12/2002 | |
| WO | WO 9205518 A * | 4/1992 | |

OTHER PUBLICATIONS

Li, Quing et al., Lane boundary detection using an adaptive randomized Hough transform, Conference Procedings v5 2004, Fifth World Congress on Intelligent Control and Automation, date: Jun. 15, 2004.*

R. Gregor et al, "EMS-Vision: A Perceptual System For Autonomous Vehicles," Proc IEEE Intelligent Vehicles Symposium 2000, pp. 52-57, Oct. 3-5, 2000.

A. L. Maganto et al. "A Monocular Vision System For Autonomous Vehicle Guidance," 2000 Int'l Conf On Image Processing, pp. 236-239, no date.

G. P. Stein et al. "A Robust Method For Computing Vehicle Ego-Motion," Proc. IEEE Intelligent Vehicles Symposium 2000, pp. 362-368, Oct. 3-5, 2000.

S. K. Gehrig et al. "A Trajectory Based Approach For The Lateral Control Of Car Following Systems," 1998 IEEE Int'l Conf on Systems, Man and Cybernetics, 1998, vol. 4, pp. 3596-3601.

H. Frohn et al. "VISOCAR: An Autonomous Industrial Transport Vehicle Guided By Visual Navigation," 1989 IEEE Int'l Conf on Robotics and Automation, 1989, May 1989, pp. 1155-1159.

S. Estable et al. "A Real-Time Traffic Sign Recognition System," Proc Intelligent Vehicles '94 Symposium, pp. 213-218, no date.

R. Janssen et al "Hybrid Approach For Traffic Sign Recognition," Intelligent Vehicles '93 Symposium, 1993, pp. 390-395, no date.

W. J. Gillner, "Motion Based Vehicle Detection On Motorways," Proc Intelligent Vehicles '95 Symposium, 1995, pp. 483-487, no date.

* cited by examiner

206. PROCESSOR 14 GENERATES, FOR EACH COLUMN, THE SQUARE OF THE SUM GENERATED FOR THE COLUMN

↓

207. PROCESSOR 14 FORMS A SUM OF THE SQUARES GENERATED IN STEP 206 AS THE VALUE OF THE COST FUNCTION FOR THE VALUE OF THE PARAMETER X1 AND THE WARPED IMAGE GENERATED THEREWITH

↓

208. PROCESSOR 14 DETERMINES, FOR EACH COLUMN, WHETHER THE VALUE OF THE SQUARE EXCEEDS A SELECTED THRESHOLD

↓

209. PROCESSOR 14 DETERMINES WHETHER IT HAS PERFORMED STEPS 202 THROUGH 208 IN CONNECTION WITH ALL OF THE SELECTED VALUES FOR PARAMETER X1 → (B)

YES ↓

210. PROCESSOR 14 IDENTIFIES, AMONG THE COST FUNCTION VALUES GENERATED IN STEP 207 FOR THE RESPECTIVE ITERATIONS, THE MAXIMUM COST FUNCTION VALUE

211. PARAMETER 14 DETERMINES THE VALUE OF THE PARAMETER X1 AND THE WARPED IMAGE ASSOCIATED WITH THE MAXIMUM COST FUNCTION VALUE IDENTIFIED IN STEP 209

212. PROCESSOR 14 PERFORMS OPERATIONS SIMILAR TO THOSE DESCRIBED ABOVE IN THE FIRST PHASE, EXCEPT THAT (A) IT PERFORMS THE OPERATIONS IN CONNECTION WITH PIXELS NOT ONLY IN THE NEAR REGION 31, BUT ALSO IN THE FAR REGION 32, AND (B) IT GENERATES THE COST FUNCTIONS ONLY IN CONNECTION WITH COLUMNS THAT WERE DETERMINED IN STEP 208 TO EXCEED THE THRESHOLD, TO DETERMINE THE VALUES FOR THE RESPECTIVE PARAMETERS.

256. THE PROCESSOR 14 THRESHOLDS THE ABSOLUTE VALUES GENERATED IN STEP 255, AND, FOR ANY ABSOLUTE VALUE THAT IS LESS THAN A PREDETERMINED THRESHOLD VALUE, THE PROCESSOR 14 SETS THE ABSOLUTE VALUE TO ZERO.

257. FOR THE ABSOLUTE VALUES THAT ARE ABOVE THE THRESHOLD, THE PROCESSOR 14 THEN FINDS LOCAL MAXIMA

258. AFTER IDENTIFYING THE LOCAL MAXIMA, THE PROCESSOR 14 SEARCHES FOR VALUES FOR THE COEFFICIENT "b" AND PITCH "d" USING A SEARCH METHODOLOGY FOR EACH OF THE LOCAL MAXIMA

260. PROCESSOR 14 SELECTS A PLURALITY OF VALUES ai

261. FOR EACH SELECTED VALUE ai, PROCESSOR 14 GENERATES AN ADJUSTED VALUE FOR COEFFICIENT bi SO THAT THE LINE X=bxZ+c (WHERE bx CORRESPONDS TO bx DETERMINED IN THE FIRST PHASE) BEST APPROXIMATES THE QUADRATIC CURVE WITH AI THE COEFFICIENT OF THE QUADRATIC TURM AND THE ADJUSTED VALUE FOR COEFFICIENT BI THE COEFFICIENT OF THE LINEAR TERM, AND THE CONSTANT BEING SET TO ZERO OVER A RANGE OF "Z" AS DETERMINED IN THE FIRST PHASE

SYSTEM AND METHOD FOR GENERATING A MODEL OF THE PATH OF A ROADWAY FROM AN IMAGE RECORDED BY A CAMERA

INCORPORATION BY REFERENCE

U.S. patent application Ser. No. 09/723,754, filed on Nov. 26, 2000, in the names of Gideon P. Stein, Ofer Mano And Amnon Shashua, and entitled "System And Method For Estimating Ego-Motion Of A Moving Vehicle Using Successive Images Recorded Along The Vehicle's Path Of Motion" (hereinafter referred to as "the Stein I patent application"), assigned to the assignee of the present application, incorporated herein by reference.

U.S. patent application Ser. No. 09/723,755, filed on Nov. 26, 2000, in the names of Gideon P. Stein And Amnon Shashua, and entitled "System And Method For Generating A Model Of The Path Of A Roadway From A Sequence Of Images Recorded By A Camera Mounted On A Moving Vehicle" (hereinafter referred to as "the Stein II patent application") assigned to the assignee of the present application, incorporated herein by reference.

FIELD OF THE INVENTION

The invention relates generally to the field of systems and methods for generating an estimate as to the structure of a roadway from a vehicle and more specifically to systems and methods for generating an estimate using an image recorded from the vehicle.

BACKGROUND OF THE INVENTION

Accurate estimation of the structure of a roadway ahead of a vehicle is an important component in autonomous driving and computer vision-based driving assistance. Using computer vision techniques to provide assistance while driving, instead of mechanical sensors, allows for the use of the information that is recorded for use in estimating vehicle movement to also be used in estimating ego-motion identifying lanes and the like, without the need for calibration between sensors as would be necessary with mechanical sensors. This reduces cost and maintenance.

There are several problems in determining the structure of a roadway. Typically, roads have few feature points, if any. The most obvious features in a road, such as lane markings, are often difficult to detect and have a generally linear structure, whereas background image structures, such as those associated with other vehicles, buildings, trees, and the like, will typically have many feature points. This will make image- or optical-flow-based estimation difficult in practice. In addition, typically images that are recorded for roadway structure estimation will contain a large amount of "outlier" information that is either not useful in estimating roadway structure, or that may result in poor estimation. For example, in estimating of roadway structure, images of objects such as other vehicles will contribute false information for the road structure estimation. In addition, conditions that degrade image quality, such as raindrops and glare, will also make accurate road structure estimation difficult.

SUMMARY OF THE INVENTION

The invention provides new and improved systems and methods for generating an estimate of the structure of a roadway using an image recorded from the vehicle.

In brief summary, the invention provides a road skeleton estimation system for generating an estimate as to a skeleton of at least a portion of a roadway ahead of a vehicle. The road skeleton estimation system includes an image receiver and a processor. The image receiver is configured to receive image information relating to at least one image recorded ahead of the vehicle. The processor is configured to process the image information received by the image receiver to generate an estimate of the skeleton of at least a portion of the roadway ahead of the vehicle.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
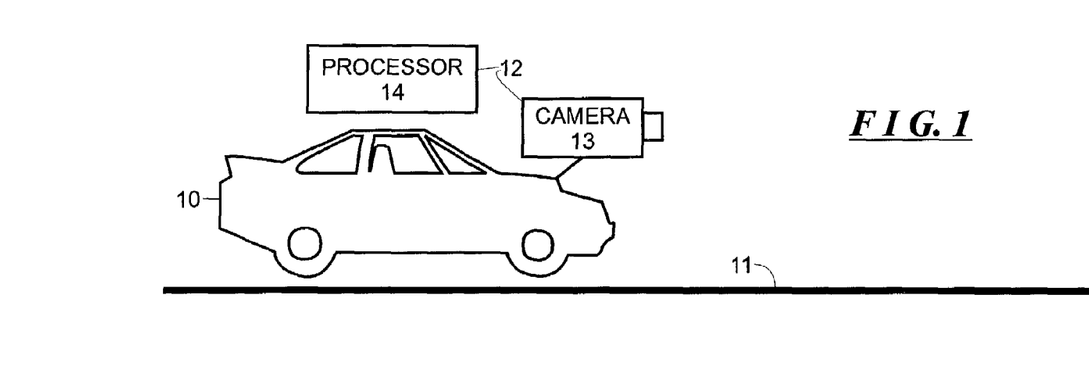
FIG. 1 schematically depicts a vehicle moving on a roadway and including a roadway skeleton estimation constructed in accordance with the invention.

FIG. 1 schematically depicts a vehicle 10 moving on a roadway 11 and including a roadway skeleton estimation system 12 constructed in accordance with the invention. The vehicle 10 may be any kind of vehicle 10 that may move on the roadway 11, including, but not limited to automobiles, trucks, buses and the like. The roadway skeleton estimation system 12 includes a camera 13 and a processor 14. The camera 13 is mounted on the vehicle 10 and is preferably pointed in a forward direction, that is, in the direction in which the vehicle would normally move, to record successive images as the vehicle moves over the roadway. Preferably as the camera 13 records each image, it will provide the image to the processor 14. The processor 14, in turn, will process information that it obtains from the successive images, possibly along with other information, such as information from the vehicle's speedometer (not separately shown) to estimate a roadway skeleton representing a portion of the roadway 11 ahead of the vehicle 10. The processor 14 may also be mounted in or on the vehicle 11 and may form part thereof. The roadway skeleton estimates generated by the processor 14 may be used for a number of things, including, but not limited to autonomous driving by the vehicle, providing assistance in collision avoidance, and the like. Operations performed by the processor 14 in estimating the roadway skeleton will be described in connection with the flow chart depicted in FIG. 3.

Before proceeding further, it would be helpful to provide some background to the operations performed by the processor 14 in estimating the skeleton of the roadway 11. This background will be described in connection with FIG. 2. Generally, the roadway is modeled as a circular arc parallel to the XZ plane in three-dimensional space. The X (horizontal) and Y (vertical) axes of three-dimensional space correspond to the "x" and "y" axes of the image plane of the images recorded by the camera 14, and the Z axis is orthogonal to the image plane. Preferably, the image plane will be the plane of the image after the image has been rectified to provide that the Z axis is parallel to the plane o the roadway 11; the Stein I patent application describes a methodology for rectifying the images to provide that the image plane will have a suitable orientation.

Figure 2:
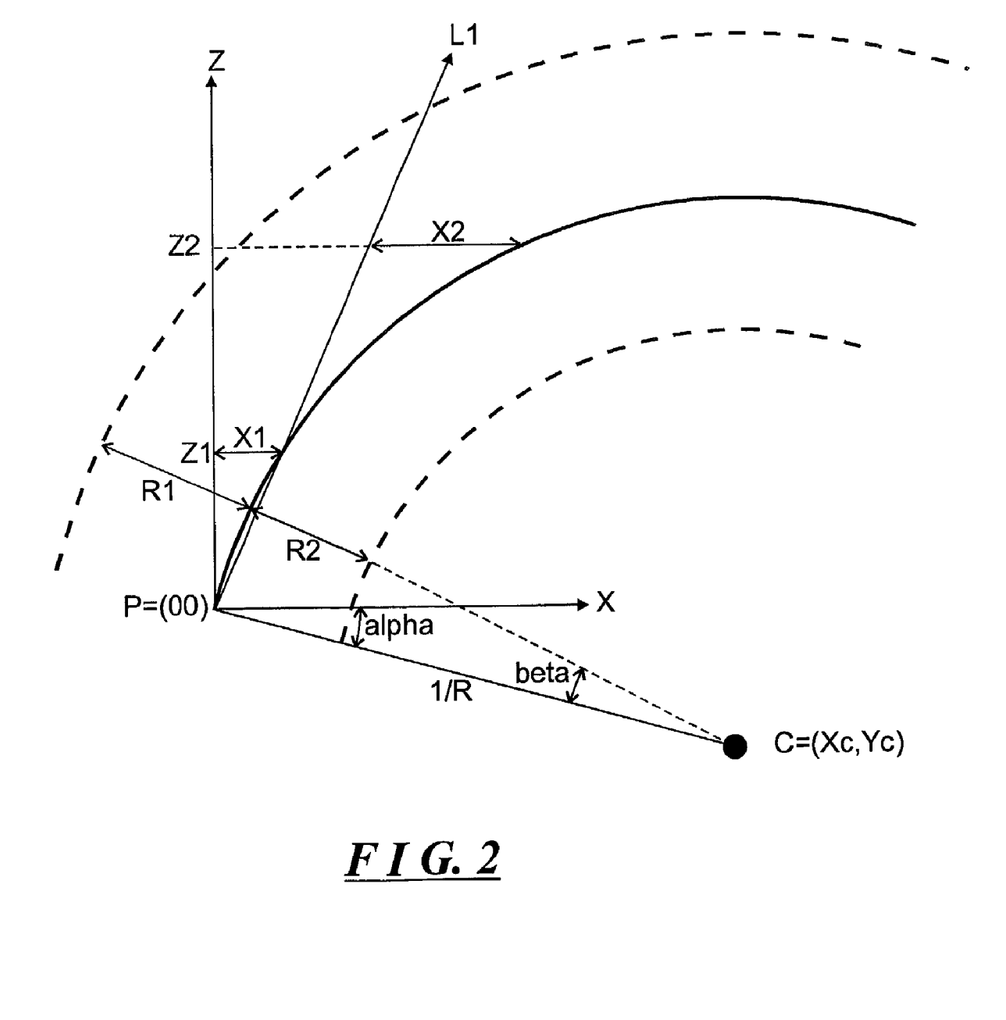
FIG. 2 depicts a graph that schematically depicts a model of a roadway skeleton, useful in understanding one embodiment of the invention.

As noted above, the roadway is modeled as a circular arc, and, with reference to FIG. 2, that FIG. circular arc in the XZ plane representing the roadway, which will be referred to as the roadway's skeleton, is identified by reference numeral S. Two lane markings 20L and 20R are also shown as dashed lines on opposite sides of the skeleton S. The distances R1 and R2 between the lane markings 20L and 20R and the skeleton S may be the same, or they may differ. The skeleton S of the roadway is modeled as an arc extending from the vehicle 10, or more specifically from the image plane of the camera 14, which is deemed to be at point P=(0,0), the origin of the XZ plane. The center of the circular arc need not be along the X axis, and, indeed will generally be at an angle α thereto. The circular arc is parameterized by three components, namely (i) the coordinates of the center (Xc, Yc) of the circular arc (the coordinates of the center will also be referred to as coordinates (a,b));

(ii) the angle α and the inverse of the radius 1/R, and (iii) for two locations Z1 and Z2 along the Z axis, values X1 and X2. In one embodiment, Z1 and Z2 are three meters and thirty meters, respectively.

For item (iii), value X1 represents the horizontal distance between the Z axis, specifically the point with coordinates (0,Z1), and the point on skeleton S with coordinates (X1, Z1). A line L1 is perpendicular to the line between point P=(0,0) and the center (Xc,Yc) of the circular arc comprising skeleton S intersecting the point P=(0,0). The value X2 represents the horizontal distance between the points on line L1 and circular arc comprising skeleton S at coordinate Z2. In addition, it will be appreciated that the origin of the XY plane, point P=(0,0) also resides on the circular arc, so that the coordinates of three points on the circular arc comprising the skeleton S, along with the coordinates of the center of the circle that includes the circular arc, will be known. Parameterizing the arc S in this manner will have several advantages. First, if the locations Z1 and Z2 are relatively far apart, depending on the radius R, the values X1 and X2 may also be relatively far apart. Second, it would allow for use of a different road model, such as a parabolic arc, as will be described below.

Given a triplet (X1, X2,d), where "d" is the pitch (that is, the angle of the camera relative to the Z axis) of the camera, and an image Ψ, it is desired to generate a warp of the image Ψ to a view in which the roadway is essentially a straight line. It is possible to warp the image onto the XZ plane, but instead the image is warped to the space R,β. Initially, given R, a and b, it should be recognized that $$R^2 = a^2 + b^2 \qquad (1).$$

In addition $$X = (R + \Delta R)\cos(\beta + \beta_0) \qquad (2)$$

and $$Z = (R + \Delta R)\sin(\beta + \beta_0) \qquad (3)$$

where $$\beta_0 = \tan^{-1}\left(\frac{a}{b}\right).$$

In addition, since, for a point P(X,Y,Z) in three-dimensional space, the coordinates (x,y) of the projection of the point in the image are given by $$x = \frac{fX}{Z} \text{ and} \qquad (4)$$

$$y = \frac{fY}{Z} \qquad (5)$$

where X and Z are determined as above and Y is a function of the camera height $Y_h$, the pitch "d" and the point's coordinate along the Z axis $$Y = -Y_h + dZ \qquad (6).$$

In equation (6), $Y_h$ is a positive value and is subtracted from "dZ" since the surface of the roadway 11 is below the camera 14. It will be appreciated that, at the point Z=0 directly below the camera, $Y = Y_h$, as required.

Since $$R^2 = (X_1 - a)^2 + (Z_1 - b)^2 \qquad (7)$$

and $$R^2 = (X_2 - a)^2 + (Z_2 - b)^2 \qquad (8)$$

and given the relation in equation (1), solving for "a" and "b"

$$a = \frac{(X_2^2 + Z_2^2)Z_1 + (X_1^2 + Z_1^2)Z_2}{2(X_2 Z_1 + X_2 Z_2)} \text{ and} \qquad (9)$$

$$b = \frac{X_1^2 + Z_1^2 - 2aX_1}{2Z_1}. \qquad (10)$$

After values for "a" and "b," the "X" and "Z" components of the center of the circular arc S in the XZ plane, the radius R can be determined using equation (1).

Using the values for "a" and "b" determined using equations (9) and (10), the value for the radius R can be determined using equation (1). In addition, using equations (4) through (6) and the coordinates (x,y) of each point in the image Ψ, the coordinates (X,Y,Z) of points in three-dimensional space that are projected onto the image can be determined. Using the coordinates (X,Y,Z), and the values for the radius R and $β_0$, the image can be warped from the (x,y) space to a ΔR,β space using equations (2) and (3).

As noted above, the image Ψ in rectangular ((x,y)) coordinates can be warped to ΔR,β space. At this point, it is desired to determine the range and resolution of those parameters. In one embodiment, it is desired to have the resolution on the order of one-tenth meter by one-tenth meter. Accordingly, it is desired to determine Δβ such that ΔβR is on the order of a predetermined length, which, in one embodiment, is one-tenth meter.

Figure 3:
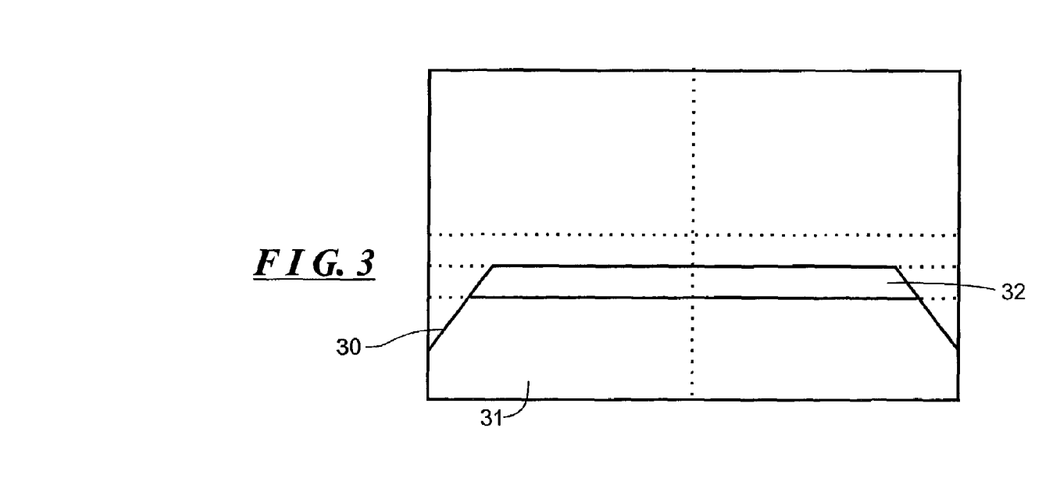
FIG. 3 schematically depicts an image of a portion of a roadway, useful in understanding outputs performed by the roadway skeleton estimation system.

The range is determined as follows. As noted above, warping the image of the roadway to R,β space effectively provides a warped image Ψ' in which the roadway is straight, not curved. An illustrative image is depicted in FIG. 3. As shown in FIG. 3, roadway 30 is divided into two regions, including a near region 31 and a more distant region 32. In one embodiment, if the vertical coordinates of the picture elements, or "pixels," that are subtended by the roadway in FIG. 3 extends from −120 to −10, the vertical coordinates of the near region 31 extend from 120 to −20. In relating the image in Δβ,R space to the physical roadway in three-dimensional coordinates, it should be noted that the bottom line of the warped image Ψ' maps to a line of width ΔX at distance Z, where $$Z = \frac{fY}{y} \tag{11}$$

and, if, as shown in FIG. 3, the width of the image, with the horizontal coordinates extending from −160 to 160 pixels, is 320

$$\Delta X = \frac{\Delta x Z}{f} = \frac{\Delta x f Y}{y f} = \frac{\Delta x Y}{y} = \frac{320 Y_h}{-120} \tag{12}$$

The range of R, which is taken to be ΔR, is 3ΔX.

In determining the range of β, it should be noted that $Z_{max}$, the maximum value of Z for the roadway, is $$Z_{max} = \frac{fY}{-10}. \text{ Since} \tag{13}$$

$\sin(\beta_{max} + \beta_0)R = Z_{max}$, the value of $\beta_{max}$ is (14)

$$\beta_{max} = -\beta_0 + \sin^{-1}\left(\frac{Z_{max}}{R}\right). \tag{15}$$

With this background, operations performed by processor 14 will be described in connection with the flow chart in FIG. 4. Generally, the operations proceed in two phases. In the first phase, the processor 14 performs a rough alignment using a straight road model. In that operation, the areas of the image Ψ' are detected that appear to belong to road direction indicators, such as lane markings, tire marks, edges and so forth. In the second phase, the rough alignment generated during the first series of steps is used, along with information in the image Ψ' including both regions 31 and 32 to determine a higher-order model. In that operation, only features found in the distant region 32 that are extensions of features found in the near region 31 are utilized, which will ensure that non-roadway features, such as automobiles, that may be found in the distant region 32 will be ignored.

Figure 4:
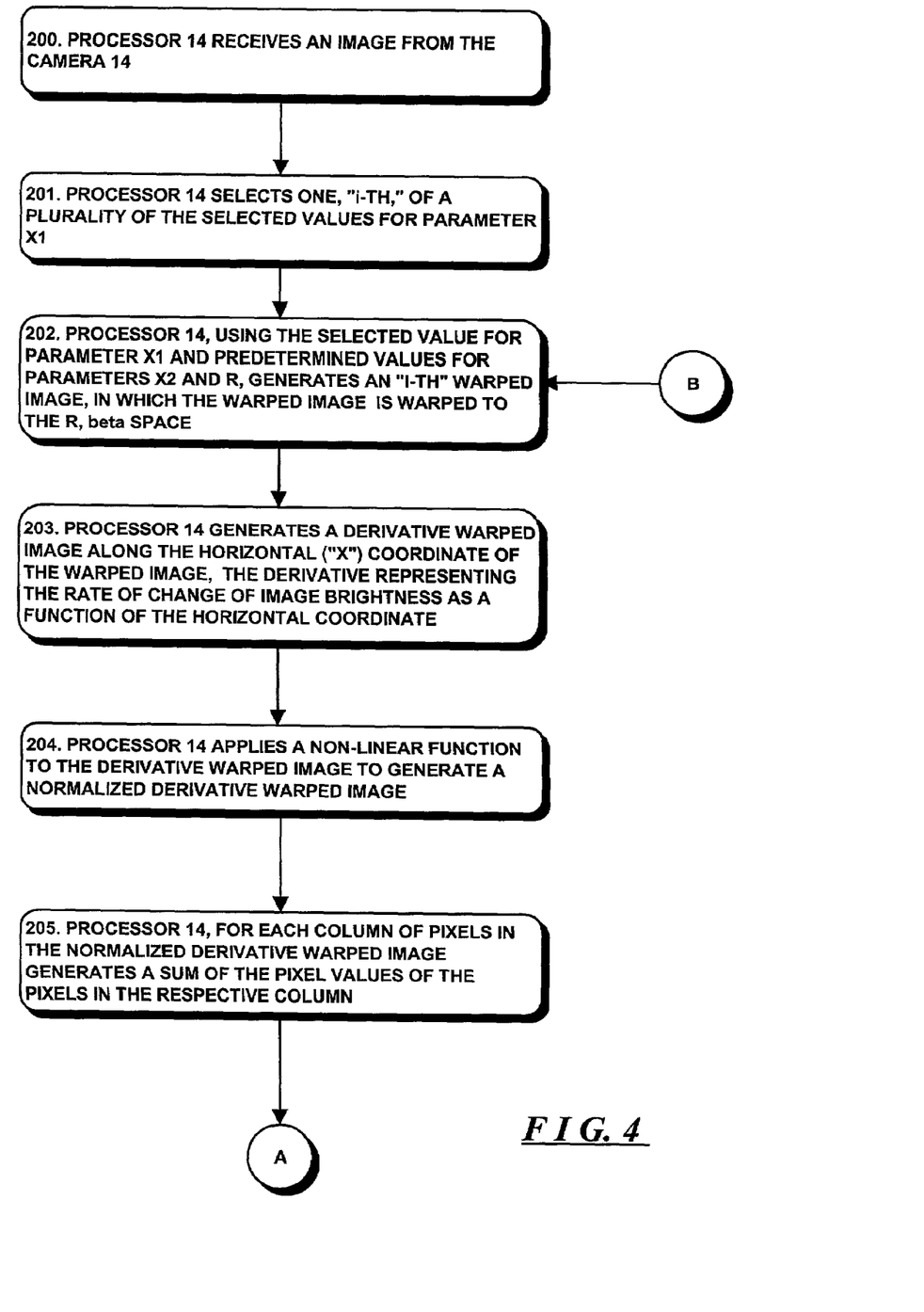
FIGS. 4 and 5 depict flow charts depicting operations performed by the roadway skeleton estimation system in estimating the skeleton of the roadway, FIG. 4 depicting operations in connection with a model in which the roadway is modeled as a circular arc and FIG. 5 depicting operations in connection with a model in which the roadway is modeled as a parabolic arc.
Figure 4A:
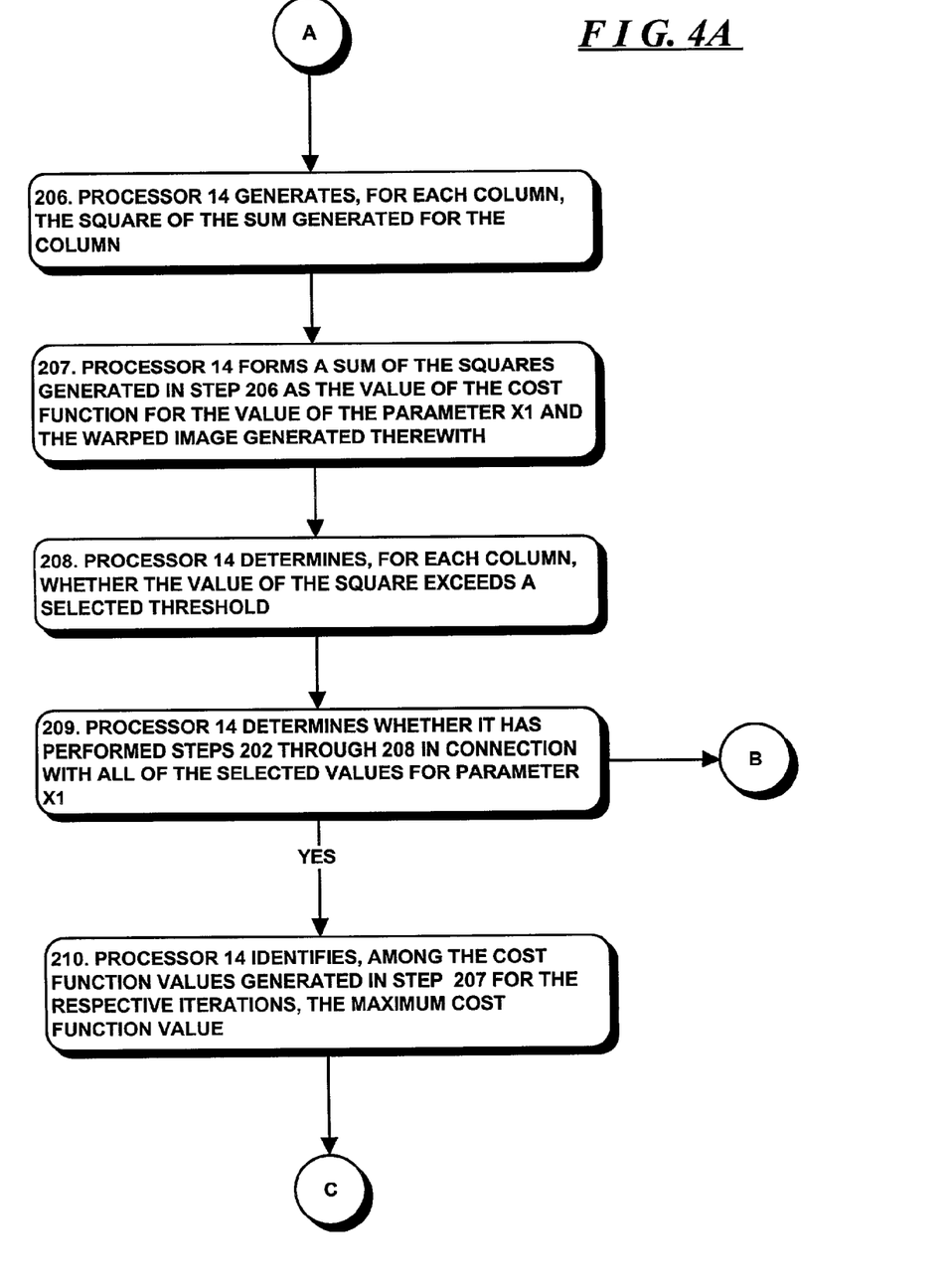
Figure 4B:
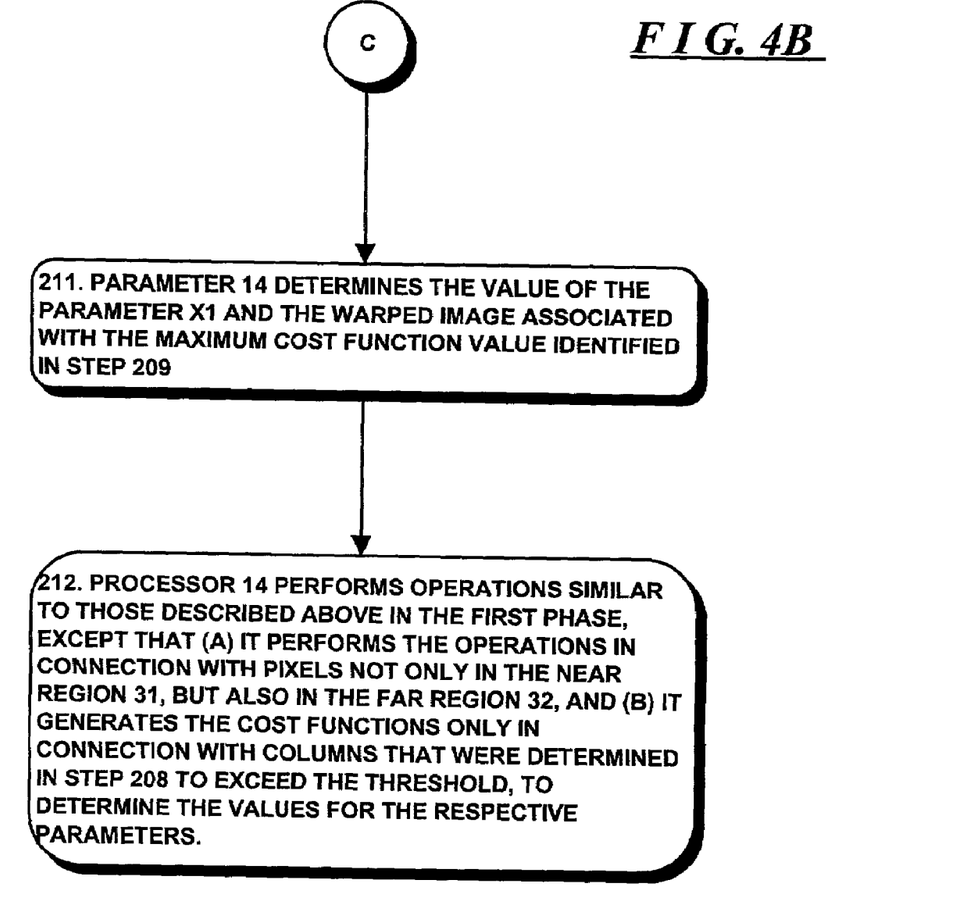

Accordingly, and with reference to FIG. 4, the processor 14 initially receives an image Ψ from the camera 14 (step 200). The image Ψ is a projection of points in rectangular three-dimensional coordinates (X,Y,Z). After receiving the image Ψ, the processor 14 performs the first series of steps in connection with the near region 31 (FIG. 3) of the roadway to generate a first-order model of the roadway. Generally, for each of a predetermined number of selected values for $X_1$, keeping predetermined values of the other parameters $X_2$ and radius R constant, the processor 14 will generate a warped image Ψ', and generates a value for a cost function for each warped image Ψ'. The value of the cost function will represent a measure of the number of vertical features that are present in the warped image Ψ'. Since, for the warped image Ψ' for which the roadway appears to be straightest, the number of vertical features that are present in the warped image Ψ' will be largest, the processor 14 can select the value of the parameter $X_1$ that was used in generating the warped image Ψ' associated with the largest cost function value as the appropriate value for parameter $X_1$.

Mores specifically, and with further reference to FIG. 4, after the processor 14 receives the image Ψ, it will select one, "i-th," of the selected values for parameter $X_1$ (step 201) and using the selected value and the predetermined values for parameters $X_2$ and R, generate a warped image $Ψ'_i$, in which the image Ψ is warped to the R,β space (step 202). Thereafter, the processor 14 will generate the cost function, as follows. The processor 14 initially generates a derivative image dΨ' along the horizontal ("x") coordinate of the image Ψ', the derivative representing the rate of change of image brightness, or intensity, as a function of the horizontal coordinate (step 203). Thereafter, to reduce the possibility that one extremely bright object might dominate, the processor 14 applies a non-linear function, such as a binary threshold or sigmoid function, to the derivative image dΨ', thereby to generate a normalized derivative image n(dΨ') (step 204). The processor 14, for each column of pixels in the normalized derivative image n(dΨ') generated in step 204, generates a sum of the pixel values of the pixels in the respective column (step 205), generates, for each column, the square of the sum generated for the column (step 206) and forms a sum of the squares generated in step 206 as the value of the cost function for the value of the parameter $X_1$ and the warped image Ψ' generated therewith (step 207). In addition, the processor 14 determines, for each column, whether the value of the square exceeds a selected threshold (step 208).

Following step 208, the processor 14 will determine whether it has performed steps 202 through 208 in connection with all of the selected values for parameter $X_1$ (step 209). If the processor 14 makes a negative determination in connection with step 209, it will return to step 202 to select another value for parameter $X_1$ and performs steps 203 through 209 in connection therewith.

The processor 14 will perform steps 202 through 209 in connection with each of the selected values for parameter $X_1$ to generate cost values therefor. When the processor 14 determines in step 209 that it has performed steps 202 through 209 in connection all of the selected values for parameter $X_1$, it will sequence to step 209 to identify, among the cost function values generated in step 207, the maximum cost function value (step 210). In addition, the parameter 14 will determine the value of the parameter $X_1$ and the warped image Ψ' associated with the maximum cost function value identified in step 209 (step 211). At this point the processor 14 will have completed the first phase, with the warped image Ψ' comprising the rough alignment.

After completing the first phase, the processor 14 begins the second phase. In the second phase, the processor 14 performs operations similar to those described above in the first phase, except that (a) it performs the operations in connection with pixels not only in the near region 31, but also in the far region 32, and (b) it generates the cost functions only in connection with columns that were determined in step 208 to exceed the threshold (step 212) to determine the values for the respective parameters.

The road skeleton S can also be modeled as a parabolic arc. In this case, it will be assumed that the major axis of the parabolic arc is along the X axis in three-dimensional space, which, as noted above, corresponds to the horizontal, or x, axis of the image Ψ. In that case, the road skeleton will conform to the equation $$X = aZ^2 + bZ + c \qquad (16),$$

where coefficients "a," "b" and "c" are constants. The camera 14 is selected to be at the point (X,Z)=(0,0) on the skeleton S, in which case constant "c" is equal to zero. Lane markings are essentially horizontal translations from the skeleton, and therefore they can be modeled using equations of the same form as equation (16), and with the same values for coefficients "a" and "b" as that in the equation for the skeleton S, but different values for coefficient "c." It will be appreciated that the value for coefficient "c" in the equations for the lane markings will indicate the horizontal displacement for the lane markings from the skeleton S for any point Z.

In the case of the parabolic arc model, the image Ψ can be warped to an image Ψ', in which the skeleton is straight, as follows. If (x,y) are the coordinates of a point in image Ψ that is a projection of a point with coordinates (X,Y,Z) in three-dimensional space $$x = \frac{fX}{Z} \qquad (17)$$
$$y = \frac{fY}{Z}.$$

If a point in the image is a projection of a point the roadway, $$Y = -Y_h + dZ \qquad (18).$$

where, as above (see equation (6)), $Y_h$ is the height of the camera off the roadway and "d" is the pitch angle of the camera 14 relative to the horizontal axis Z. In equation (18), $Y_h$ is a positive value, and is subtracted from "dZ" since the surface of the roadway 11 is below the camera 14. It will be appreciated that at the point Z=0 directly below the camera, $Y = Y_h$, as required. If values for "f," the focal length of the camera 14, $Y_h$ and d are known, it is possible to transform the coordinates (x,y) of points in the image Ψ to the coordinates (X,Z) of points in three dimensional space, and vice versa. The values of the parameters f and $Y_h$ are known and the value of parameter d will be determined in the course of determining values for coefficients "a" and "b" for the parabolic arc model equation (16). Also, given the values of coefficients "a" and "b" in equation (16), an overhead view (X,Z) of the skeleton of the roadway, that is, a view in the XZ plane, can be warped to a warped view (C,Z) in which the skeleton S has the equation C=0. In that case, roadway markings, which, as noted above, are also modeled as parabolic arcs, will have equations C=c, where "c" is the value of the constant "c" in equation 16 for the respective roadway markings.

Accordingly, it is desired to determine the values of coefficients "a" and "b" and the pitch angle "d" that, when used to warp the overhead view (X,Z) of the skeleton S to the overhead view (C,Z), will result in a skeleton S that is a straight line. In that operation, a cost function is defined for the view (C,Z) whose value will be a maximum for the correct values of "a," "b" and "d." As with the methodology described above in connection with FIG. 4, searching for the maximum of the cost function's value is performed in two general phases, with a near region being used in the first phase, and a more extended region being used in the second phase. The value of the cost function is determined as follows. Given assumed values for "a," "b" and "d," the image Ψ is warped to an image Ψ'. The image Ψ is an image of the roadway (and possibly other objects and features) in which the skeleton of the roadway is, in an overhead (X,Z) view, a parabolic arc. On the other hand, image Ψ' is an image of the roadway (and possibly other objects and features) in which the skeleton of the roadway may, in an overhead (C,Z) view, be a straight line, depending on the values for "a," "b" and "d" that were used in the warping. After the warped image Ψ' has been generated, the warped image is projected onto the warped image's horizontal "x" axis by summing the pixel values in the respective columns. The derivative of the sums across the warped image's horizontal "x" axis is then determined, and a sum of the absolute values of the derivative across the warped image's horizontal "x" axis is generated, with that sum being the value of the cost function. These operations are repeated for a number of assumed values for "a," "b" and "d" to generate a number of cost function values.

The value of cost function value will be larger if the projection onto the warped image's horizontal projection is sharper, which will occur if there are more vertical features in the warped image Ψ', and it would be possible to select the warped image Ψ' for which the cost function value is greatest as the warped image Ψ' in which the skeleton S of the roadway appears as a straight line. If there were no objects in the image Ψ, and hence warped image Ψ', other than the roadway 11, this would be correct.

However, if there is clutter, such as other objects, in the image Ψ, and hence warped image Ψ', with strong edges, the value of the cost function tends to get dominated by the clutter, which may result in an improper warped image Ψ' being selected. The two-phase methodology reduces the likelihood of this occurring. In the first phase, the image Ψ is warped to provide warped images Ψ' using a straight road model, that is, with value of coefficient "a" set to zero and the values of "b" and "d" may be zero or non-zero. In each warped image Ψ', areas that appear to belong to road direction indicators, such as lane markings and tire tracks, as opposed to lines associated with other objects, such as cares, are then identified. In addition, during the first phase, a preliminary value for coefficient "b" and a value for pitch "d" are determined.

Thereafter, in the second phase, image Ψ is again warped, to generate warped images $Ψ'''_i$, using selected values "$a_i$" for coefficient "a" and the preliminary value for coefficient "b" and the value for pitch "d" that were determined during the first phase. Using areas vertically higher in the respective warped images, which represent areas in three-dimensional space (X,Y,Z) that are further from the vehicle 10, the cost function values are generated, and an assessment as to the warped image $Ψ'''_i$ for which the skeleton S most approximates a straight line. The value "$a_i$" that was used in generating the warped image $Ψ'''_i$ for which the skeleton S most approximates a straight line is selected as the value for coefficient "a" for the model represented by equation (16). The value pitch "d" identified in the first phase is selected as the pitch "d." The value of coefficient "b" value for the model represented by equation (16) corresponds to the value $\tilde{b}$ which, as the coefficient of the linear term in the parabolic model for which the value "$a_i$" is identified as the coefficient "a" in the parabolic model, most approximates the straight line model, using the preliminary value for "b," that was developed during the first phase.

Figure 5:
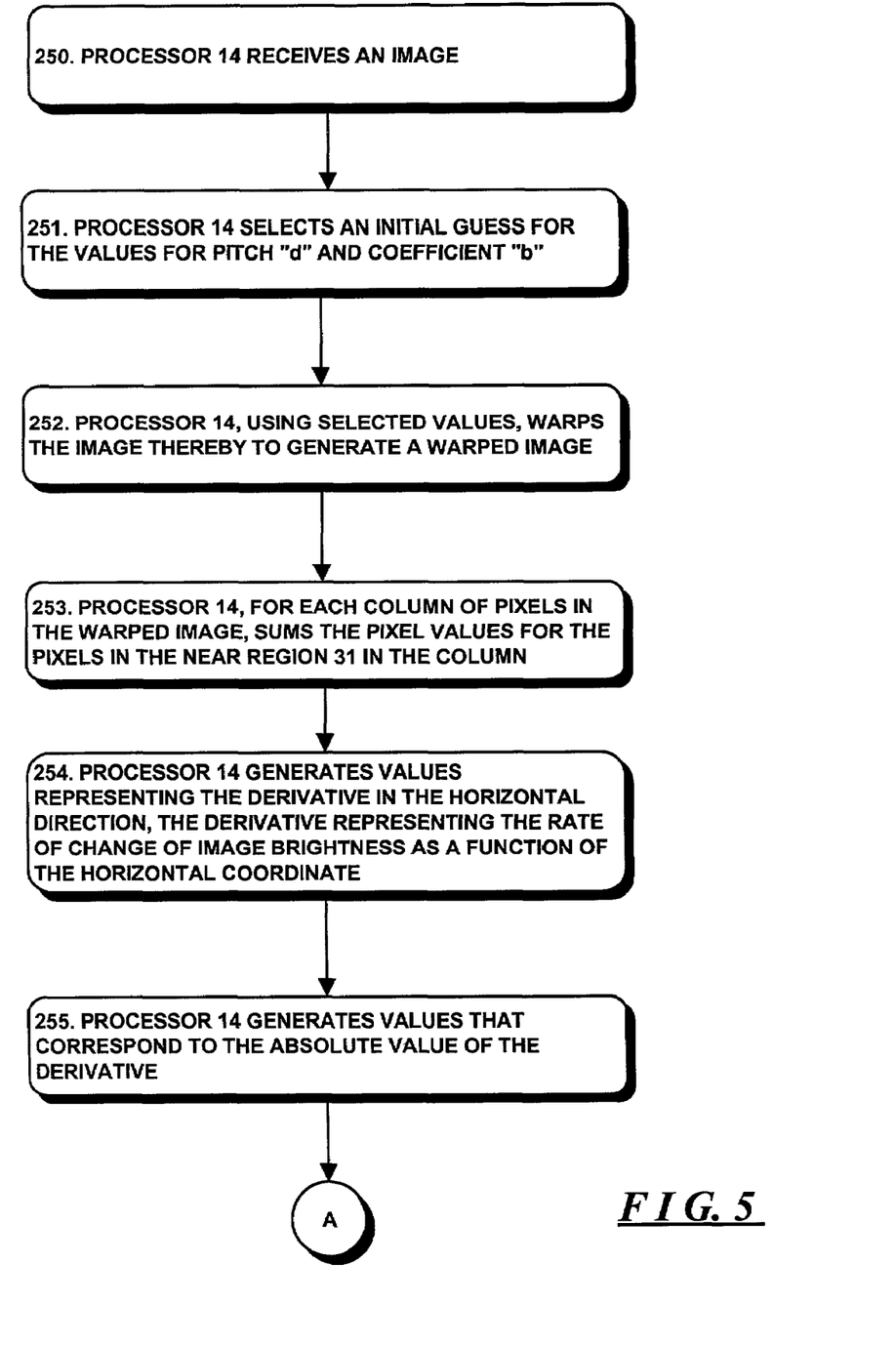
Figure 5A:
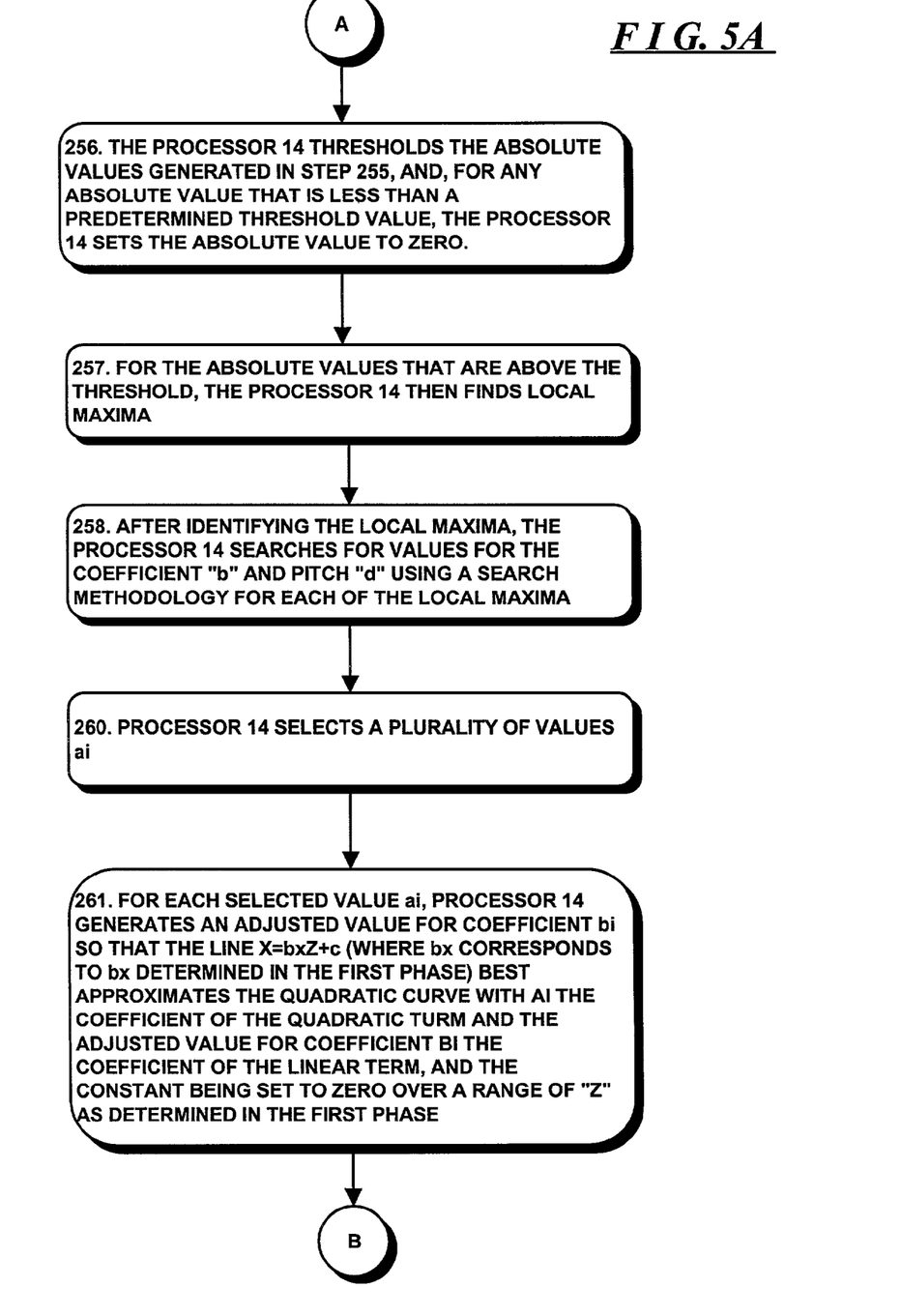
Figure 5B:
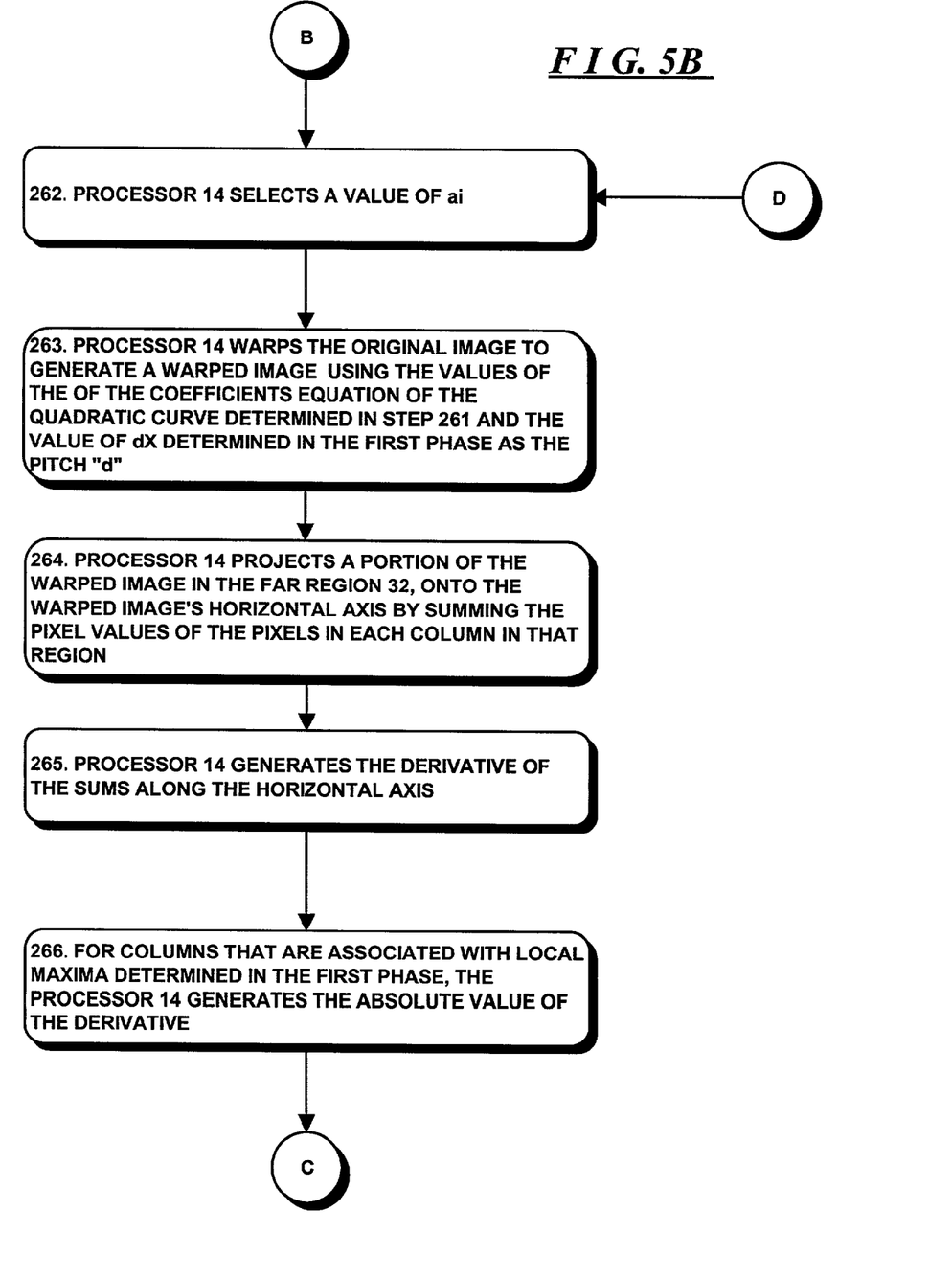
Figure 5C:
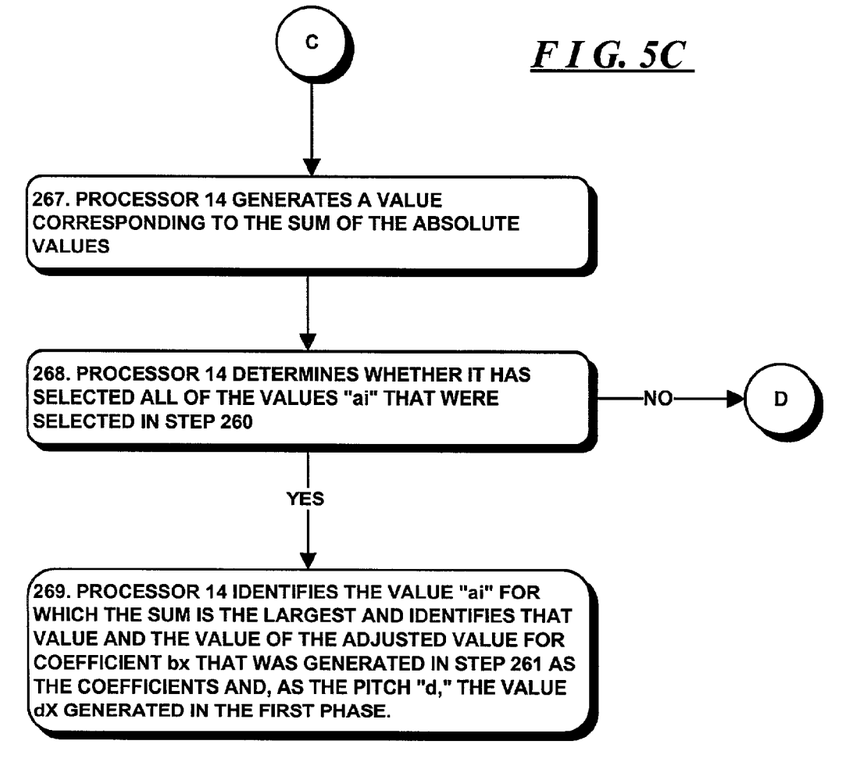

More specifically, and with reference to the flow chart in FIG. 5, after the processor 14 receives an image Ψ (step 250), it will, in the first phase, select initial guess for the values for pitch "d" and coefficient "b" (step 251) and, using those values, warp the image Ψ (step 252) thereby to generate a warped image Ψ'. The processor 14 then, for each column of pixels in the warped image Ψ', sums the pixel values for the pixels in the near region 31 in the column (step 253), generates values representing the derivative in the horizontal direction (step 254) and generates values that correspond to the absolute value of the derivative (step 255). It will be appreciated that portions of the warped image Ψ' that contain, for example, edges or lane markings will produce peaks in the absolute values generated in step 255, since the edges and lane markings will correspond to fast transitions from dark-to-light or light-to-dark regions of the images. The processor 14 then thresholds the absolute values generated in step 255 (step 256), that is, for any absolute value that is less than a predetermined threshold value, the processor 14 sets the absolute value to zero. For the absolute values that are above the threshold, the processor 14 then finds local maxima (step 257). The local maxima, which will be identified as peaks "$p_i$," typically correspond to lane markings in the warped image Ψ', although some peaks $p_i$ may be caused by a strong edge that is not part of the roadway, such as an automobile a short distance ahead of the vehicle 10.

After identifying the peaks $p_i$, the processor 14 searches for values for the coefficient "b" and pitch "d" using a search methodology for each of the peaks $p_i$ (step 258). In that operation, in each of a series of iterations "j" (j=1, ..., J), the processor 14 selects a value $d_j$ for pitch d. In each iteration "j," the processor 14, in each of a series of iterations "k" (k=1, ...), selects a value $b_k$ and performs steps 252 through 257 in connection therewith to find values $b_k^i$ for which the respective peaks $p_i$ are maximum. After completing the iterations "j" the set of points $(d_j, b_k^i)$ in a (d,b) plane that are associated with each peak $p_i$ form a line $l_i$. The lines $l_i$ that are associated with features along the roadway, such as lane markings and tire tracks, will intersect at or near a point $(d_x, b_x)$ in the (d,b) plane, and the processor 14 will identify that point and determine the appropriate values for coefficient "b" and pitch "d" as $b_x$ and $d_x$, respectively. If there are any objects that are not associated with features of the roadway 11, such as automobiles, in the near region 31 that are associated with peaks $p_i$, lines $l_i$ that are associated therewith will generally not be near point $(d_x, b_x)$ and will be ignored. In addition, it will be appreciated that, since the lines $l_i$ that are at or near point $(d_x, b_x)$ are associated with features along the roadway, and the processor 14 can readily determine which columns in the warped image Ψ' contain those features. This, along with the values of coefficient "b" and pitch "d" will be used in the second phase.

In the second phase, the processor 14 determines a value for coefficient "a" using regions of the image including both the near region 31 and the far region 32, generally emphasizing columns that are associated with or near the subset of peaks $p_i$ that it identified as being associated with features of the roadway. In the second phase, the processor 14 initially selects a plurality of values $a_i$ (step 260) and, for each value $a_i$, generates an adjusted value $\tilde{b}_i$ so that the line $X=b_x Z+c$ (where $b_x$ corresponds to $b_x$ determined in the first phase) best approximates the curve $X=a_i Z^2 + \tilde{b}_i Z + c$ with the value of "c" being set to zero (reference equation 16) over a range of "Z" as determined in the first phase (step 261). Thereafter, the processor 14 selects a value of "$a_i$" (step 262) and warps the original image Ψ to generate a warped image Ψ'"$_i$ using the values "$a_i$" and "$b_x$" as coefficients "a" and "$\tilde{b}_i$," and value $d_x$ as the pitch "d" (step 263). The processor 14 then projects a portion of the warped image Ψ'"$_i$, specifically the portion in the far region 32, onto the warped image's horizontal axis by summing the pixel values of the pixels in each column in that region (step 264) and then generates the derivative of the sums along the horizontal axis (step 265). For columns that are associated with peaks $p_i$ that the processor 14 had determined in the first phase were associated with features of the roadway 11, such as lane markings and tire tracks, the processor 14 will generate the absolute value of the derivative (step 266) and generate a value corresponding to the sum of the absolute values (step 267). It will be appreciated that, by performing steps 266 and 267 in connection only with columns that were determined in the first phase to be associated with features of the roadway 11, the processor 14 will minimize contributions due to features that are not associated with the roadway, such as automobiles, which may otherwise unduly influence the result.

After performing steps 262 through 267 for the value "$a_i$" that was selected in step 262, the processor 14 will determine whether it has selected all of the values "$a_i$" that were selected in step 260 (step 268), and, if not, return to step 262 to select another value "$a_i$" and perform steps 263 through 267 in connection therewith. The processor will perform steps 262 through 267 through a plurality of iterations until it has generated the sum of the absolute value of the derivative for all of the values "$a_i$" that were selected in step 260. When the processor 14 determines in step 268 that it has selected all of the values "$a_i$" that were selected in 260, it will have generated a sum of the absolute value of the derivative for all of the values "$a_i$," in which case it will sequence to step 269. In step 269, the processor identifies the value "$a_i$" for which the sum is the largest (step 269). The correct parameters for the skeleton S are, as the value of coefficient "a," the value $a_i$ that was selected in step 269, as the value of coefficient "b," the value of $\tilde{b}$ that was generated for that value "$a_i$" in step 261, and, as the pitch "d," the value $d_x$ generated in the first phase.

The invention provides a number of advantages. In particular, the invention provides a system for estimating the skeleton S of a roadway 11 for some distance ahead of a vehicle. Two specific methodologies are described, one methodology using a model in which the roadway is modeled as a circular arc, and the other methodology using a model in which the roadway is modeled as a parabolic arc, in both methodologies requiring only one image, although it will be appreciated that the system can make use of a combination of these methodologies, and/or other methodologies. Determining the skeleton of a roadway for some distance ahead of a vehicle can be useful in connection with autonomous or assisted driving of the vehicle.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. Apparatus for monitoring motion of a vehicle relative to a road on which the vehicle is traveling, comprising:
    a camera that acquires an image of a scene in which the road is present; and
    a controller that
    a) defines a plurality of real-space curves having different shapes and/or orientations that are candidates for substantially lying along a contour of the road;
    b) for each candidate curve, for each of a plurality of lines of pixels in the image that image regions of the scene lying along the candidate curve or that image regions of the scene lying along a same curve homologous with and having a same orientation as the candidate curve, determines a value that is a function of gradients of pixel intensities at locations along the line;
    c) determines a candidate curve that most closely lies along the road contour responsive to the values determined for the lines; and
    d) uses the determined candidate curve to monitor motion of the vehicle relative to the road.

2. A method for monitoring motion of a vehicle relative to a road on which the vehicle is traveling, the method comprising:
    acquiring a camera image of a scene in which the road is present;
    defining a plurality of real-space curves having different shapes and/or orientations that are candidates for substantially lying along a contour of the road;
    for each candidate curve, for each of a plurality of lines of pixels in the image that image regions of the scene lying along the candidate curve or that image regions of the scene lying along a same curve homologous with and having a same orientation as the candidate curve, determining a value that is a function of gradients of pixel intensities at locations along the line; and
    determining a candidate curve that most closely lies along the road contour responsive to the values determined for the lines; and
    using the determined candidate curve to monitor motion of the vehicle relative to the road.

3. A method according to claim 2 wherein determining a candidate curve comprises determining a value for a cost function for a candidate curve responsive to the values determined for the lines of pixels in the image associated with the candidate curve and determining the candidate curve responsive to the value of the cost function.

4. A method according to claim 3 wherein determining the value for a line comprises determining for each of a plurality of locations along the line a value for a derivative of pixel intensity at the location of the pixel as a function of displacement in the image in a direction perpendicular to the line.

5. A method according to claim 4 wherein determining a value for a line comprises determining a sum of the derivatives determined for locations lying along the line.

6. A method according to claim 5 wherein the cost function is a function responsive to the absolute value of the value determined for the line.

7. A method according to claim 6 wherein the cost function is a function of a sum of the absolute values of the values determined for the lines.

8. A method according to claim 6 wherein the cost function is a function of a sum of the squares of the values determined for the lines.

9. A method according to claim 3 wherein determining the value for a line comprises determining a sum of intensities of pixels lying along the line and determining a derivative of the sum as a function of line position.

10. A method according to claim 9 wherein the cost function is function responsive to the absolute value of the derivative determined for the line.

11. A method according to claim 10 wherein the cost function is a function of a sum of the absolute values of the derivatives determined for the lines.

12. A method according to claim 3 wherein determining a cost function comprises;
    partitioning the camera image into near and far portions that respectively image regions of the scene that arc closer and farther from the camera;
    determining the value for each line responsive to pixel intensities lying along the line in the near portion of the camera image;
    for those lines for which the value exceeds a given threshold, determining an adjusted value responsive to pixel intensities lying along the line in the far portion of the image; and
    using the adjusted values to determine the cost function.

13. A method according to claim 2 wherein determining a value for a line in the camera image comprises:
    for each candidate curve, transforming the camera image to a test image having features defined relative to a rectilinear coordinate system having first and second orthogonal axes so that the lines in the camera image are transformed into straight lines parallel to the first axis in the test image; and
    determining the value responsive to gradients of pixel intensities for locations along the straight line in the test image that corresponds to the line in the camera image.

14. A method according to claim 13 wherein determining a value for a line in the camera image comprises:
    determining a sum of intensities of pixels that lie along the straight line in the test image that corresponds to the line in the camera image; and
    determining a derivative of the sum as a function of position of the straight line along the second axis.

15. A method according to claim 2 wherein each candidate curve is an arc of a circle and wherein defining the plurality of candidate arcs comprises defining a plurality of circles, each of which defines a different one of the candidate curves.

16. A method according to claim 15 wherein defining the plurality of circles comprises determining each circle to pass through a different set of three points.

17. A method according to claim 16 wherein the first point in each set is a point in real space at which the camera is located.

18. A method according to claim 17 wherein the second and third points are points determined to lie along the contour of the road at different distances from the camera.

19. A method according to claim 3 wherein each candidate curve is a parabola.

20. A method according to claim 19 wherein each candidate parabola has its major axis perpendicular to the optic axis of the camera.

21. A method according to claim 20 wherein each candidate parabola passes through the location of the camera.

22. A method according to claim 20 wherein a coefficient of a linear term of the parabola is determined responsive to gradients at pixel locations in a first region of the image corresponding to a region of the scene close to the camera.

23. A method according to claim 21 wherein a coefficient for the quadratic term of the parabola is determined responsive to the coefficient of the linear term and to gradients at pixel locations in a second region of the image corresponding to a region of the scene relatively.

24. A method according to claim 2 wherein each candidate curve is a straight line.

25. A method according to claim 12 wherein transforming the camera image comprises determining a pitch angle for the optic axis of the camera relative to the road and using the pitch angle to transform the camera image.

26. A method according to claim 3 wherein determining a cost function comprises weighting the gradients to moderate contributions to the cost function from a bright object in the camera image.

* * * * *

UNITED STATES PATENT AND TRADEMARK OFFICE
CERTIFICATE OF CORRECTION

PATENT NO. : 7,151,996 B2 Page 1 of 1
APPLICATION NO. : 09/834736
DATED : December 19, 2006
INVENTOR(S) : Gideon P. Stein It is certified that error appears in the above-identified patent and that said Letters Patent is hereby corrected as shown below:

On the title page item (63),

Related U.S. Application Data: Provisional application No. 60/197,393, filed on April 14, 2000 should be added.

Signed and Sealed this

Tenth Day of April, 2007

JON W. DUDAS
*Director of the United States Patent and Trademark Office*